J. H. STUMP
Combined Grass-Cutter and Rake.
No. 196,265. Patented Oct. 16, 1877.
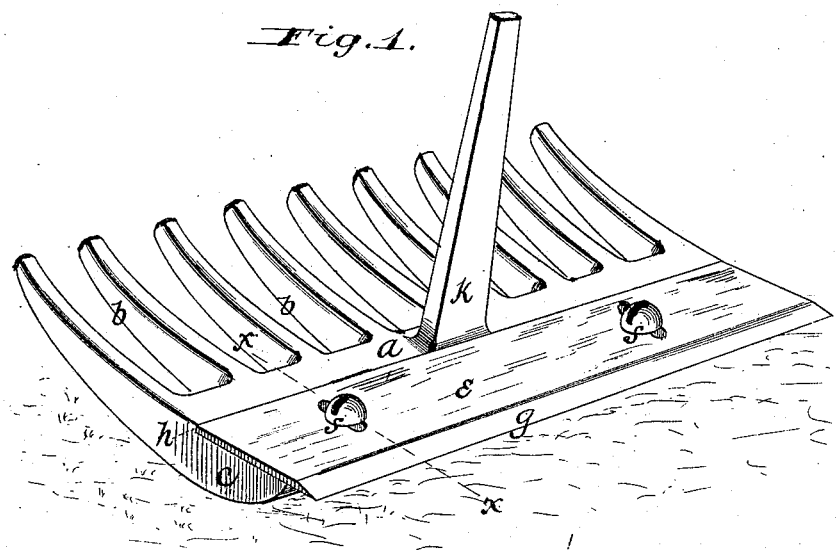
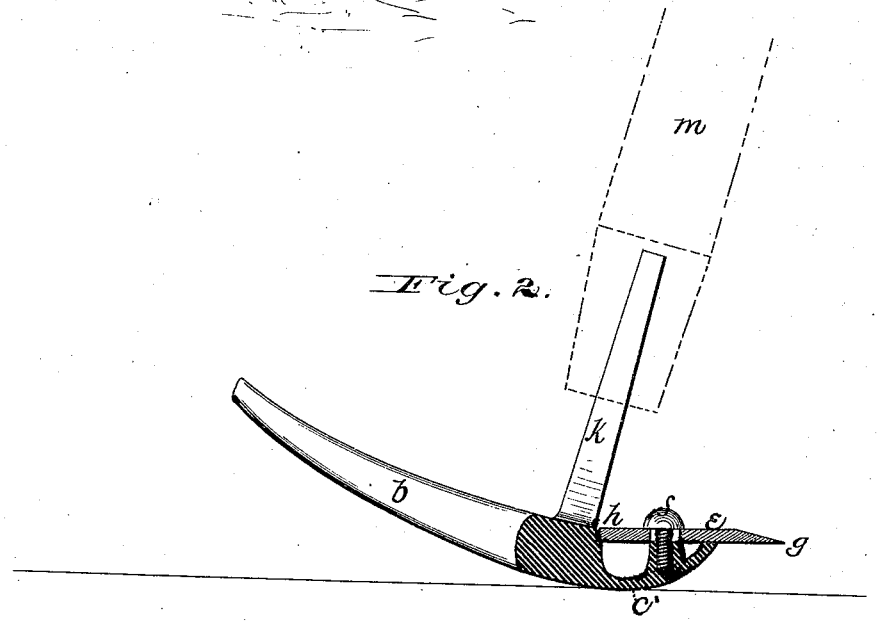

UNITED STATES PATENT OFFICE.

JOHN HENRY STUMP, OF BALTIMORE, MARYLAND.

IMPROVEMENT IN COMBINED GRASS-CUTTER AND RAKE.

Specification forming part of Letters Patent No. 196,265, dated October 16, 1877; application filed June 25, 1877.

*To all whom it may concern:*

Be it known that I, JOHN HENRY STUMP, of the city and county of Baltimore, State of Maryland, have invented a new and useful Combined Grass-Cutter and Rake, which is fully set forth in the following specification, reference being had to the accompanying drawings.

The object of this invention is to provide a hand-tool for gardening purposes, which, in a practical and convenient form, will combine a rake and a grass-knife, so that, by means of the common handle, the person using it can cut grass and maintain an erect posture.

In the drawings, Figure 1 is a perspective view of my invention; and Fig. 2 is a sectional elevation of the same, the section being made through the line $x$ $x$ of Fig. 1.

The rake $a$ is cast with curved teeth $b$ and a projecting head, $c$, arranged to receive the grass-knife $e$, which is secured thereto with screws $s$ $s$. Its outer face, $c'$, is like a rocker, and when in the position for cutting grass, as shown in the drawings, it is passed knife forward. This curved face will enable the tool to pass smoothly over the ground, the curved face likewise acting as a guide and gage, and enabling the workman to cut evenly.

The knife $e$ has two slots for the passage of the screws $s$ $s$, and is provided with a knife-edge, $g$, and a blunt edge, $h$. It is easily removable for sharpening, and when reversed, with the blunt edge out, it becomes a hoe, and will serve all the ordinary purposes of that tool. By removing entirely the knife-blade the head $c$ can be used as a hoe also.

The tang $k$ is cast upon the head $c$, preferably at an angle of sixty degrees with the plane of the knife, so that the handle $m$, when the knife is in a horizontal plane, shall be at a proper inclination for convenient use.

It is intended that this grass-cutter shall be used in such places as are ordinarily cut with a sickle or "grass-hook." It saves the necessity of stooping, and will reach places which cannot be trimmed with a lawn-mower.

I claim as my invention—

The rake $a$, having a curved face, $c'$, in combination with a removable knife, $e$, constructed and arranged substantially as and for the purpose set forth.

J. HENRY STUMP.

Witnesses:
  J. W. HARVEY, Jr.,
  J. KANE.